United States Patent [19]

Troesch

[11] Patent Number: 4,543,103

[45] Date of Patent: Sep. 24, 1985

[54] METHOD OF DYEING A GLASS SUBSTRATE WITH A POLYCATIONIC DYESTUFF

[75] Inventor: Jürg Troesch, Allschwil, Switzerland

[73] Assignee: Sandoz Ltd., Basel, Switzerland

[21] Appl. No.: 600,488

[22] Filed: Apr. 16, 1984

[30] Foreign Application Priority Data

Apr. 15, 1983 [DE] Fed. Rep. of Germany ....... 3313692

[51] Int. Cl.⁴ .......................... D06P 3/80; B41M 1/34; C03C 17/28; C09D 11/82
[52] U.S. Cl. ............................................. 8/523; 8/654; 8/655; 8/657; 8/658; 8/661; 8/685; 428/357
[58] Field of Search .................... 8/523, 654, 655, 657, 8/658

[56] References Cited

U.S. PATENT DOCUMENTS

| | | | |
|---|---|---|---|
| 2,955,899 | 10/1960 | Bailey et al. | 8/523 |
| 3,301,845 | 1/1967 | Hosokawa et al. | 8/523 |
| 3,399,186 | 8/1968 | Hosokawa et al. | 8/523 |
| 3,617,162 | 11/1971 | June et al. | 8/523 |
| 3,970,422 | 7/1976 | Maeda et al. | 8/523 |
| 4,273,707 | 6/1981 | Pedrazzi | 260/187 |
| 4,291,095 | 9/1981 | Chase et al. | 428/391 |
| 4,363,761 | 12/1982 | Pedrazzi | 260/153 |
| 4,367,172 | 1/1983 | Pedrazzi | 260/153 |
| 4,465,627 | 8/1984 | Pedrazzi | 260/153 |

FOREIGN PATENT DOCUMENTS

| | | |
|---|---|---|
| 896373 | 10/1983 | Belgium . |
| WO81/03179 | 11/1981 | PCT Int'l Appl. . |
| 2117783 | 10/1983 | United Kingdom . |

*Primary Examiner*—A. Lionel Clingman
*Attorney, Agent, or Firm*—Gerald D. Sharkin; Richard E. Vila; Thomas C. Doyle

[57] ABSTRACT

A glass substrate is dyed or printed with a water-soluble polycationic dyestuff in the absence of a size or binding agent. The resulting dyeings have good rubbing fastnesses.

24 Claims, No Drawings

METHOD OF DYEING A GLASS SUBSTRATE WITH A POLYCATIONIC DYESTUFF

The present invention refers to a process for dyeing a glass substrate, particularly glass fibres, with a cationic dyestuff in the absence of a size.

Glass is a substrate which is difficult to dye. Many solutions have been proposed including surface treatment with a coloured coating dyeing with a basic dyestuff after pre-treatment with a sulphur- or oxygen-containing acid or peroxyacid; and dyeing of the molten mass with inorganic pigments. In the case of surface treatment with a coloured coating, it is not the glass surface which is dyed but the coating. Cationic, direct or acid dyestuffs as well as pigments can be used but their selection depends on their compatibility with the coating composition. Furthermore, the resulting dyeings do not have satisfactory rubbing fastness and the physical and chemical properties of the glass substrate are modified by the presence of the coating. Dyeing of a glass substrate with basic dyestuffs after a pre-treatment gives colourations in light tones with unsatisfactory light and wet fastness properties. Furthermore, both dyeing methods lead to unlevel colourations. Addition of inorganic pigments to molten glass also gives unsatisfactory results, as the resulting shades are very variable. In addition the inorganic pigment may adversely affect the chemical as well as the physical properties of the glass.

It has now been found that a glass substrate can readily be dyed with polycationic dyestuffs in the absence of any sizing agent.

Accordingly, the invention provides a process for dyeing or printing a glass substrate comprising treating the substrate with a dyeing liquor or a printing paste containing a water-soluble polycationic dyestuff.

By the expression "glass substrate" is to be understood material made of glasses of various compositions (alkali silicates, alumino-silicates, borosilicates and the like) and properties, e.g. as defined by DIN 12 111, DIN 12 116 or DIN 52 322. Glass substrates to be dyed or printed according to the invention may be in various forms, e.g. fibres, filaments, staple fibres, fibre roving, fabrics, webs, non-wovens, flakes, powder. Particularly preferred are glass fibres and other glass substrates which may be further processed into textile articles.

By polycationic dyestuffs is meant dyestuffs having at least 1.3 cationic groups (quaternary or protonated nitrogen atoms) per dye molecule, whereby a non-integral number of cationic groups is to be understood as an average value for the molecules of the dyestuff in question. The dyestuffs may also contain anionic groups, particularly sulphonic acid groups, but if any such are present, then the number of cationic groups per molecule must be at least one greater than the number of anionic groups per molecule. Expressed numerically, if there are x cationic and y anionic groups per molecule, then $x \geq 1.3$ and $0 < y \leq (x-1)$. More preferably the dyestuffs are biscationic.

The dyes may be metallized or metal free, but metal complex dyes are preferred, more preferred being 1:1 and 1:2 metal complex azo dyes. For 1:2 complexes, containing two dyestuff units per metal atom, the requirement of at least 1.3 cationic groups per molecule applies to each dyestuff unit and not to each molecule of complex. As well as azo dyes, other cationic dyes, for example phthalocyanine (preferably copper phthalocyanine) dyes and anthraquinone dyes may be used. Dyes containing a fibre-reactive group may also be employed.

Preferably the dyes have, as the metal-free cation, a molecular weight of at least 400, more preferably 500–1000. More preferred dyes are those which give a high degree of exhaust on cotton, as measured by the following test: the dye should give an exhaust ratio (ratio of dye exhausted on to substrate to total dye in bath) of 90–100% as defined by DIN 54000 or ISO RIOS/I 1959, part 1, when dyed on to mercerised cotton at 1/1 standard depth from a boiling aqueous electrolyte-free bath at 20:1 liquor to goods ratio, dyeing time 90 minutes.

Dyestuffs meeting these conditions are predominantly those having peripheral or terminal cationic groups in the molecule. One preferred group of dyestuffs are phthalocyanine dyestuffs containing two or more cationic groups which are attached to the periphery of the planar phthalocyanine ring system. A further preferred group of dyestuffs have a substantially linear structure comprising three or more homo- or hetero-aromatic rings or fused ring systems joined directly or by bridging groups in such a way that there are two terminal rings or ring systems and one or more medial rings or ring systems, there being on average at least 1.3 cationic groups per molecule attached to terminal rings or ring systems, and none elsewhere. In a more preferred group there are two or more, preferably two cationic groups per molecule, one or more, preferably one on each terminal ring or ring system and none elsewhere.

Dyestuffs having the above properties and structural features are known in the art, and are disclosed for example in the following published patents and patent applications: German published application Nos. 1 061 010, 1 064 661, 1 621 702, 2 250 676, 2 251 041, 2 604 699, 2 627 680 and 2 810 246; U.S. Pat. Nos. 3 709 903, 3 784 599, 3 839 426, 3 933 787, 3 935 182, 3 996 282, 4 046 502, 4 103 092, 4 146 558, 4 153 598 and 4 213 897; and European published application Nos. 13 751, 14 677, 14 678, 15 232, 15 233, 15 511, 16 726, 24 321, 24 322, 34 725, 38 299, 54 616, 56 574, 62 824, 62 825, 63 261 and 65 595. Particularly preferred cationic dyestuffs are those disclosed in published British Patent Application Nos. 2 076 421A, 2 081 734A, 2 082 615A and 2 104 538A, British Pat. No. 2 019 873 and published European Application No. 41 040, the contents of which are incorporated herein by reference.

The dyeing of the glass substrate according to the invention may be carried out by a continuous or discontinuous method such as used for dyeing textiles or paper. The glass substrate may be dyed by an exhaust method, e.g. with circulation of the substrate or of the dyeing liquor, at a pH from 1 to 14, preferably from 3 to 7, advantageously at a temperature from 20° to 150° C., preferably from 20° to 100° C., the liquor to goods ratio varying within 1:1 to 10,000:1. When the glass substrate is dyed by a continuous dyeing method, it is preferably impregnated with the dyeing liquor and then treated with steam or hot air, e.g. in a steamer or convection oven at a temperature from 100° to 130° C. or submitted to thermofixation at a temperature from 100° to 230° C. The dyeing liquor may contain, in addition to the dyestuffs, further additives, e.g. a thickening agent such as an alginate, or a solubilizing agent such as a glycol or urea. As it is known in the textile field, thickening agents are used to inhibit the bleeding of the dyeing liquor or printing paste. Such products are then removed during the subsequent washing or rinsing step.

As it will be appreciated, the dyeing or printing process of the invention is carried out without the help of a size or a binding agent, whether in the dyeing liquor or printing paste or in the form of a coating on the glass substrate. By the term "size" is to be understood the products generally used for improving the spinning of glass fibres and their further processing in fabrics. Examples of such products are the textile sizes, particularly those normally used for sizing the warp threads during weaving. These products when present on the glass would fix the dyestuffs, thus hindering a direct fixation of the dyestuffs on the glass substrate. By "binding agent" is meant homo- and copolymers of ethylenically unsaturated monomers or formaldehyde condensation polymers such as are used for example in coating compositions for glass fibres or in binding agent dispersions for textile or cellulose pulp fibre non-wovens. They are generally applied on the glass substrate in admixture with the dyesuffs as a film-forming composition which is then cured.

The process of the invention is effected on uncoated glass substrate, i.e. a substrate which is free from a size or other products such as oil, grease or waxes which would hinder the direct dyeing of the glass surface.

To remove such a coating it is recommended to submit the substrate to a pre-treatment, for example a treatment with hydrochloric acid preferably in 0.5 to 10% diluted form. Such a pretreatment is conveniently carried out at a temperature from 20° to 100° C., preferably from 50° to 100° C. for 1 to 60 minutes. The liquor ratio is from 1:1 to 10,000:1. Depending on the nature of the size used for the coating, the substrate may be pretreated with another acid, e.g. formic acid, or a detergent or an oxidant such as hydrogen peroxide.

Glass is known to have a smooth surface and although it is relatively inert in comparison with organic textile materials, it is an advantage of the process of the invention that no special treatment is needed before dyeing to improve the inherent dyeability of the glass.

Level dyeings are obtained on the glass substrate. In addition, the dyeings possess good light and wash fastnesses, excellent rubbing fastnesses and a high bleeding fastness in water, alcohol and soap. No post-treatment of the resulting dyeings is necessary.

Glass substrate dyed according to the invention can be used in a large field of applications, e.g. for reinforcing plastic or textiles, non-flammable decorative articles, clothes and curtains, thermal, acoustic, electrical and humidity insulation, optical glasses and light wave cables.

The following Examples in which all parts and percentages are by weight illustrate the invention.

EXAMPLE 1

5 Parts of glass staple fibres having a 12μ fineness and a staple length of 8 mm are suspended in 100 parts water of 90° C. and 0.15 parts of a 25% aqueous solution of the dye

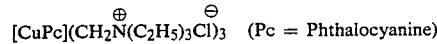

[CuPc](CH$_2$N(C$_2$H$_5$)$_3$Cl)$_3$   (Pc = Phthalocyanine)

are added. The pH of the dyebath is 5.5. After 20 minutes dyeing time at 90° the suspension is diluted with cold water to a fibre concentration of 0.01% based on the dyebath volume. A glass fibre web is produced in a Rapid Köthen sheet forming apparatus after suction of the dyebath.

There is obtained a turquoise blue dyed glass fibre web. The resulting dyeing has a good water and wash fastness.

EXAMPLE 2

A glass fibre fabric is treated at 90° for 20 minutes with 5% hydrochloric acid at a ratio 1:50 to remove the size. The fabric is then rinsed with cold water.

5 Parts of the resulting fabric are introduced in a dyebath containing 0.3 parts of a 25% aqueous solution of the dye

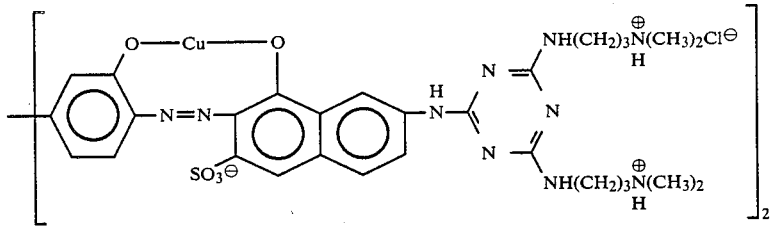

and 98 parts water. The pH of the dyebath is 6.2. The temperature of the dyebath is raised to 98° and dyeing is carried out at 98° for 30 minutes. The fabric is then rinsed with cold water in overflow. The resulting fabric is dyed in a blue shade having good water, wash and rubbing fastnesses.

EXAMPLE 3

A glass fibre fabric, pre-treated as disclosed in Example 2, is immersed in a dyebath containing 50 parts of the dye

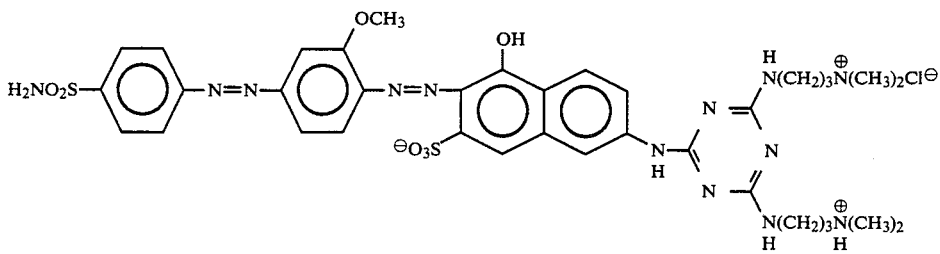

per 1000 parts. The pick-up is 30%.

The impregnated fabric is introduced in a circulating air dryer, dried at 210° for 1 minute and submitted to thermofixation. Thereafter the fabric is rinsed with cold water.

There is obtained a glass fibre fabric dyed in a red tone with good rubbing and wet fastnesses.

EXAMPLE 4

20 Parts glass powder having a particle size of from 0.3 to 0.5 mm are suspended in 80 parts water of 25° and 0.7 parts of the dye

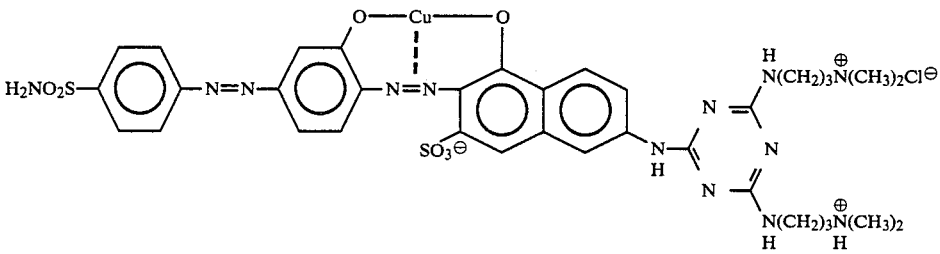

are added. After a dyeing time of 30 minutes at 95°, the dyebath is removed by filtration, the filtration residue is rinsed with cold water and then dried.

A navy blue dyed glass powder is thus obtained.

EXAMPLE 5

20 Parts of glass fibre fabric are dyed in accordance with the procedure of Example 4, using 0.5 parts of the dyestuff of the formula

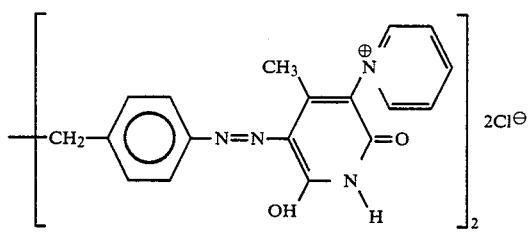

A yellow dyeing is obtained.

What is claimed is:

1. A process for dyeing or printing a glass substrate which comprises treating the substrate with a dyeing liquor or printing paste containing a water-soluble polycationic dyestuff having, per dyestuff molecule, at least 1.3 cationic groups selected from quaternary nitrogen atoms and protonated nitrogen atoms, said number of cationic groups being at least one greater than the number of anionic groups per molecule.

2. A process according to claim 1 wherein the substrate and the dyeing liquor or printing paste are free of size and binding agent.

3. A process according to claim 1, in which the dyestuff is biscationic.

4. A process according to claim 1, in which the dyestuff is a 1:1 or 1:2 metal complex azo dyestuff.

5. A process according to claim 1, in which the dyestuff, as the metal-free cation, has a molecular weight of at least 400.

6. A process according to claim 1, in which the dyestuff is a phthalocyanine dyestuff containing 2 or more cationic groups which are attached to the periphery of the phthalocyanine ring system.

7. A process according to claim 1, in which the dyestuff has a substantially linear structure comprising three or more homo- or hetero-aromatic rings or fused ring systems joined directly or by bridging groups in such a way that there are two terminal rings or ring systems and one or more medial rings or ring systems, there being on average at least 1.3 cationic groups per molecule attached to terminal rings or ring systems, and none elsewhere.

8. A process according to claim 7, in which the dyestuff has one cationic group on each terminal ring or ring system and none elsewhere.

9. A process according to claim 1 in which the glass substrate is uncoated.

10. A process according to claim 1, in which the dyeing liquor or printing paste is free from a sizing or binding agent.

11. A process according to claim 1, in which the glass substrate is a glass fibre substrate.

12. A process according to claim 1 which comprises exhaust dyeing the substrate in the dyeing liquor at a temperature of 20° to 150° C.

13. A process according to claim 2 which comprises exhaust dyeing the substrate in the dyeing liquor at a temperature of 20° to 150° C.

14. A process according to claim 1 which comprises impregnating the substrate with the dyeing liquor and then treating the impregnated substrate with steam or hot air at a temperature of 100° to 130° C. or with thermofixation at a temperature of 100° to 230° C.

15. A process according to claim 2 which comprises impregnating the substrate with the dyeing liquor and then treating the impregnated substrate with steam or hot air at a temperature of 100° to 130° C. or with thermofixation at a temperature of 100° to 230° C.

16. A process according to claim 3 in which the dyestuff is a 1:1 or 1:2 metal complex azo dyestuff having a molecular weight of at least 400.

17. A process according to claim 2 in which the dyestuff is biscationic.

18. A process according to claim 17 in which the dyestuff is a 1:1 or 1:2 metal complex azo dyestuff having a molecular weight of at least 400.

19. A process according to claim 18 wherein the dyestuff has a molecular weight of 500 to 1000.

20. A process according to claim 19 which comprises exhaust dyeing the substrate at a temperature of 20° to 100° C. and a pH of 3 to 7.

21. A process according to claim 19 which comprises impregnating the substrate with the dyeing liquor and then treating the impregnated substrate with steam or hot air at a temperature of 100° to 130° C. or with thermofixation at a temperature of 100° to 230° C.

22. A process according to claim 13, in which the dyestuff has a substantially linear structure comprising three or more homo- or hetero-aromatic rings or fused ring systems joined directly or by bridging groups in such a way that there are two terminal rings or ring systems and one or more medial rings or ring systems, there being one cationic group on each terminal ring or ring system and none elsewhere.

23. A process according to claim 15, in which the dyestuff has a substantially linear structure comprising three or more homo- or hetero-aromatic rings or fused ring systems joined directly or by bridging groups in such a way that there are two terminal rings or ring systems and one or more medial rings or ring systems, there being one cationic group on each terminal ring or ring system and none elsewhere.

24. A process according to claim 1 in which the dyeing or printing is effected on glass which has not been treated to improve its inherent dyeability.

* * * * *